N. STOW,
Assignor to S. S. WHITE.
Flexible Shaft.
No. 8,607. Reissued Mar. 4, 1879.
Fig 1.
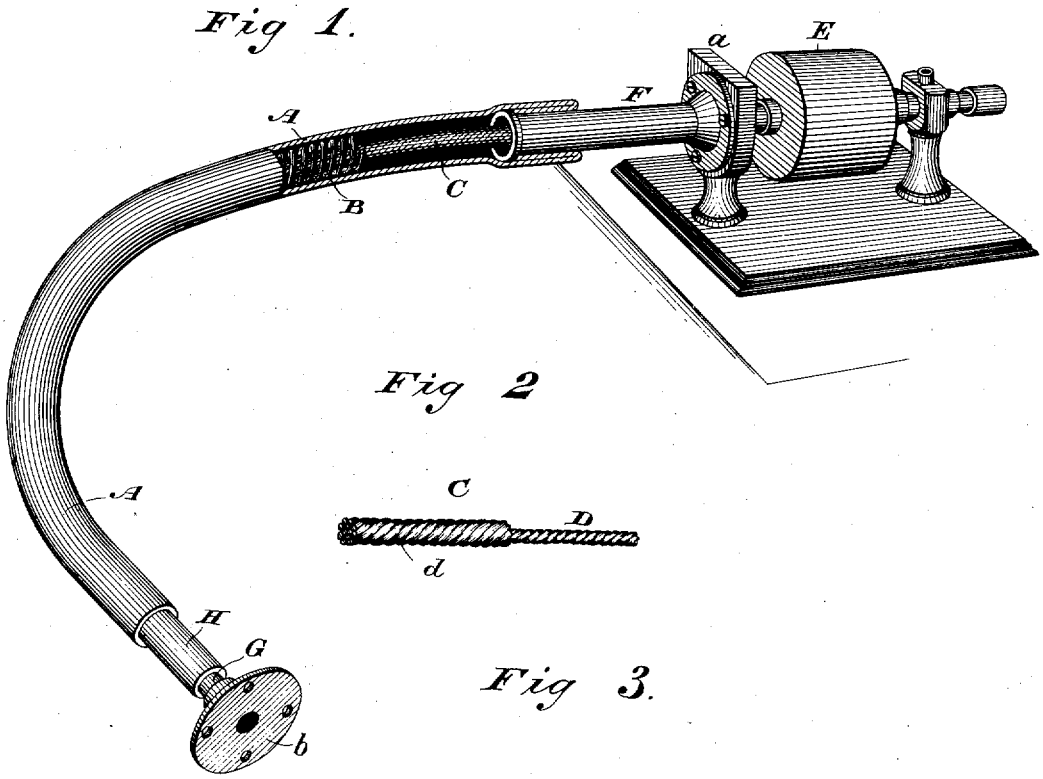
Fig 2
Fig 3.
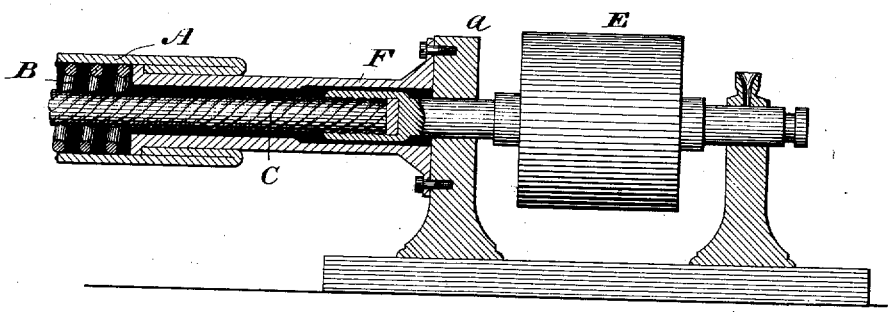
Fig 5.
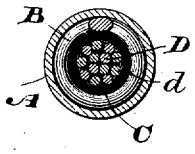
Fig 4.
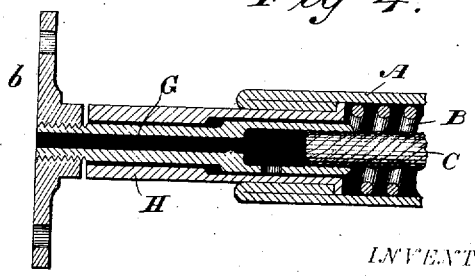
WITNESSES
Wm A Stinkle
Geo W Breck.
INVENTOR
Nelson Stow.
By his Attorneys
Baldwin Hopkins & Peyton

UNITED STATES PATENT OFFICE.

NELSON STOW, OF BINGHAMTON, NEW YORK, ASSIGNOR TO SAMUEL S. WHITE, OF PHILADELPHIA, PENNSYLVANIA.

IMPROVEMENT IN FLEXIBLE SHAFTS.

Specification forming part of Letters Patent No. 130,253, dated August 6, 1872; Reissue No. 5,939, dated June 30, 1874; Reissue No. 8,607, dated March 4, 1879; application filed January 17, 1879.

*To all whom it may concern:*

Be it known that I, NELSON STOW, of Binghamton, in the county of Broome and State of New York, have made an invention of certain Improvements in Fexible Shafts and their Appurtenances, of which the following is a specification:

My invention has reference to the means of transmitting motion from a rigid driving-shaft, which may be operated by some motor, to a movable object, such as a tool or other appliance, so that the same can be operated by power while its position is varied by the hand of the operator.

The invention consists of various combinations of certain mechanical devices with a flexible wire-cord shaft composed of strands of wire combined together like the strands of a cord or a rope, as distinguished from a hollow helical coil of spring-wire, such as the helical-wire shaft of the Thirion English patent of 1858, and the Kennedy American patent of 1866.

The invention consists, also, of some combinations of the said devices with a peculiar construction of compound wire-cord shaft. The said devices are the following, viz: a rigid driving-shaft, which is an inflexible shaft that may be revolved in a bearing or bearings, and fitted with a belt-pulley, and which is employed to impart motion to the flexible wire shaft; a driving-shaft bearing, in which said rigid driving-shaft is sustained with the capacity to revolve on its axis; a rigid journal or spindle at the outer end of the flexible wire shaft, or that end which is farthest from the driving-shaft, which journal is inflexible, and has a smooth circular surface, so that it is well adapted to revolve in a socket or sleeve bearing, and forms a convenient means of connecting the flexible wire shaft with the article to which the revolving motion is to be transmitted; a socket bearing or sleeve in which the said rigid journal is fitted to revolve, this socket-bearing being movable with the rigid journal and outer end of the wire-cord shaft, so that the rigid journal and the article to which the flexible cord shaft transmits motion may be manipulated by the operator grasping the socket-bearing; a flexible wire casing covering the flexible wire-cord shaft; a flexible cover for the wire casing, to prevent the engagement of objects in the crevices between the wires of the casing; a driving-shaft bearing-socket, which is a tubular socket inclosing the end of the driving-shaft, and forming a convenient means of securing the inner end of the shaft-casing.

The peculiarity of the compound wire-cord shaft is, that it is compounded of two sets of wires, which operate jointly, the one set being twisted into a cord which forms the core of the shaft, and the second set enveloping the said core.

The various combinations and constructions which constitute the invention are set forth in the claims at the close of this specification. In order that they may be fully understood, I have represented them in the accompanying drawings, and will proceed to describe a flexible wire-cord shaft and its appurtenances embodying my entire invention in the best form in which it was (in my opinion) embodied by me previous to my application for the original patent.

Figure 1 of the accompanying drawings is a perspective view of the said flexible wire-cord shaft and its appurtenances, with portions of the flexible cover and wire casing removed. Fig. 2 represents a portion of the compound wire-cord shaft detached. Fig. 3 represents an enlarged view of the driving-shaft and a portion of the flexible wire-cord shaft, with the bearings of the driving-shaft and other devices in section. Fig. 4 represents the outer end of the flexible wire-cord shaft, with the adjacent devices in section. Fig. 5 represents a transverse section of the flexible wire-cord shaft and its compound casing.

In the said drawings, C is the flexible wire-cord shaft, which is composed of a central cord or core, D, and of a layer of enveloping-wire, *d*. The core, as shown in Figs. 2 and 5, is composed of several strands of steel wire, which insures its strength and elasticity. The core is inclosed by a layer, *d*, of brass wires, wound at the same pitch and direction as those of the core. This layer gives the shaft additional strength without materially diminishing its flexibility.

E is a driving-shaft, which is a rigid shaft fitted to revolve in ordinary bearings, and is connected with the inner end of the flexible wire shaft C. F is the driving-shaft bearing-socket, which is secured to the bearing *a*, in which the driving-shaft revolves. The free or outer end of the flexible shaft C has a rigid journal or spindle, G, attached to it, which is fitted to revolve in a socket or sleeve bearing, H. The end of this journal is provided with a collar, *b*, for connections when the communicated motion is to be continued in one direction. When the flexible wire-cord shaft is used to impart motion directly to a tool or appliance whose positions are to be consecutively changed, the collar may be dispensed with and the appliance attached to the journal or spindle to be guided by hand. The free end of the shaft may then be readily adapted to communicate motion to an article at any point within its reach on the bench of the machine, or for many domestic purposes. The peculiarity of its construction will also allow of its use for driving heavy machinery. The flexible wire-cord shaft is incased by a flexible wire casing, B, which is made of spirally-coiled wire, inclosing a tubular cavity sufficiently large to permit the flexible wire-cord shaft to revolve freely within it, and this wire casing is covered by the flexible cover A, made of leather or other flexible material.

In the present case the compound casing formed by the flexible wire casing B and the flexible cover A is secured at its inner end to the driving-shaft bearing-socket F, and at its outer end to the socket-bearing H.

The compound casing, being thoroughly flexible throughout its length, adapts itself to the curvature of the shaft, and prevents articles from being wound upon or otherwise affected by its revolution. When both ends of the compound casing are secured to the sockets, I have found it expedient to construct the driving-shaft, as represented in Fig. 3, with journals of greater length than the lengths of its bearings, so that the driving-shaft may move endwise in its bearings, or, in other words, that there may be endwise movement of the casing and flexible shaft relatively to each other, to adapt the combination of the two to variations which may occur in their endwise relationship by reason of the greater or less extent to which the flexible wire-cord shaft is bent.

I claim as my invention—

1. The combination, substantially as hereinbefore set forth, of the flexible wire-cord shaft, the driving-shaft, the bearing of the driving-shaft, the tubular socket connected with the bearing of the driving-shaft, and the flexible wire casing.

2. The combination, substantially as hereinbefore set forth, of the flexible wire-cord shaft, the driving-shaft, the bearing of the driving-shaft, the tubular socket of the driving-shaft bearing, the flexible wire casing, and the flexible cover therefor.

3. The combination, substantially as hereinbefore set forth, of the flexible wire-cord shaft, the rigid journal thereof, and the flexible wire casing.

4. The combination, substantially as hereinbefore set forth, of the flexible wire-cord shaft, the rigid journal thereof, the flexible wire casing, and the flexible cover therefor.

5. The combination, substantially as hereinbefore set forth, of the flexible wire-cord shaft, the rigid journal thereof, the socket-bearing of said journal, and the flexible wire casing.

6. The combination, substantially as hereinbefore set forth, of the flexible wire-cord shaft, the rigid journal thereof, the socket-bearing of said journal, the flexible casing, and the flexible cover thereof.

7. The combination, substantially as hereinbefore set forth, of the rigid driving-shaft, the flexible wire-cord shaft, the rigid journal thereof, the socket-bearing of said journal, and the compound casing for said cord-shaft, the whole so connected that the endwise relationship of the wire-cord shaft and the compound casing may vary when the two are bent.

8. The combination, substantially as hereinbefore set forth, of the rigid journal with a compound flexible wire-cord shaft composed of core-wires and enveloping-wires.

9. The combination, substantially as hereinbefore set forth, of the rigid driving-shaft with a compound flexible wire-cord shaft composed of core-wires and enveloping-wires.

10. The combination, substantially as hereinbefore set forth, of the rigid driving-shaft, the rigid journal, and the flexible wire-cord shaft, composed of core-wires and enveloping-wires.

NELSON STOW.

Witnesses:
JOHN B. BOWEN,
CHARLES O. ROOT.